(12) United States Patent
Shoge (10) Patent No.: US 6,325,386 B1
(45) Date of Patent: Dec. 4, 2001

(54) ROTATABLE SEAL ASSEMBLY FOR A BICYCLE HUB TRANSMISSION

(75) Inventor: Akihiko Shoge, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/281,634

(22) Filed: Mar. 30, 1999

(51) Int. Cl.⁷ ............... F16J 15/16; F16J 15/32; F16C 33/76; F16H 16/44
(52) U.S. Cl. .......... 277/500; 277/551; 277/572; 384/486; 475/285; 475/297
(58) Field of Search .......... 277/500, 549, 277/551, 562, 572, 576; 384/486; 475/285, 297

(56) References Cited

U.S. PATENT DOCUMENTS

| | | | |
|---|---|---|---|
| 3,075,779 | * | 1/1963 | Holdhan . |
| 3,438,283 | * | 4/1969 | Schwerdhofer . |
| 3,554,562 | * | 1/1971 | Carlisle ............... 277/149 |
| 3,600,974 | * | 8/1971 | Schwerdhofer . |
| 4,132,421 | * | 1/1979 | Corsi et al. . |
| 4,153,260 | * | 5/1979 | Joyner . |
| 4,371,176 | | 2/1983 | Shimano ............... 277/56 |
| 4,544,168 | * | 10/1985 | Hans et al. ............... 277/84 |
| 4,735,430 | * | 4/1988 | Tomkinson . |
| 4,973,297 | * | 11/1990 | Bergles ............... 475/289 |
| 5,233,910 | * | 8/1993 | Laichinger et al. . |
| 5,318,486 | * | 6/1994 | Lutz . |
| 5,503,144 | * | 4/1996 | Bacon . |
| 5,531,510 | | 7/1996 | Yamane ............... 301/110.5 |
| 5,690,471 | * | 11/1997 | Sasaki . |
| 5,709,283 | * | 1/1998 | Nief ............... 277/188 |
| 5,803,617 | * | 9/1998 | Ohnuki et al. . |

FOREIGN PATENT DOCUMENTS

| | | |
|---|---|---|
| 686113 B1 | 12/1995 | (EP) . |
| 803430 A2 | 10/1997 | (EP) . |
| 876953 A2 | 11/1998 | (EP) . |

* cited by examiner

Primary Examiner—Lynne H. Browne
Assistant Examiner—Vishal Patel
(74) Attorney, Agent, or Firm—James A. Deland (57) ABSTRACT

A seal for a bicycle transmission includes an annular housing and an annular seal member. The housing includes a side wall defining a plurality of circumferentially disposed slots. The seal member is retained to the housing and extends radially inwardly. The seal member is formed from a resilient material, and the housing is formed from a material that is more rigid than the seal member.

23 Claims, 11 Drawing Sheets

ROTATABLE SEAL ASSEMBLY FOR A BICYCLE HUB TRANSMISSION

BACKGROUND OF THE INVENTION

The present invention is directed internal bicycle hub transmissions and, more particularly, to an internal hub transmission which uses a sealing assembly that rotates with the hub shell.

Bicycles, particularly recreational bicycles referred to as city cruisers, are inexpensive and are easy to ride, and are thus widely used to commute to work or school or for shopping. With this type of recreational bicycle, an internal hub transmission is sometimes mounted at the rear wheel in order to ride at high speeds over flat terrain or to ride uphill with minimal exertion.

An internal hub transmission generally comprises a hub axle that is fixed to the bicycle frame; a hub shell that is able to rotate around the hub axle; a driving member for receiving a driving force from the drive chain; a planet gear mechanism that is housed in the hub shell for transmitting the driving force from the driving member to the hub shell through a plurality of transmission paths; and a clutch mechanism for selecting among the plurality of transmission paths. The clutch mechanism has a clutch member for switching the drive transmission path by moving in the direction of the hub axis, and a push rod that presses the clutch member.

Because the driving member and hub shell are capable of rotation relative to each other, there is a space between the two which creates a risk that water, dirt and other contaminants may enter the inside of the hub shell and adversely affect the operation of the planet gear mechanism and other components. Some internal hub transmissions use a labyrinth-type sealing mechanism to inhibit entry of contaminants into the hub shell. However, since such a system relies on staggered barrier walls with spaces between the barrier walls, there is still a risk that contaminants can migrate between the barrier walls and enter the inside of the hub shell, especially if the hub is immersed in water. Other internal transmission hubs use a rubber seal mounted to an inner peripheral surface of an annular metal ring which, in turn, is press-fit onto the inner peripheral surface of the hub shell. While such a sealing mechanism is effective, the rubber seal inevitably becomes worn as a result of the sliding contact with the driving member as the hub rotates relative to the driving member. Because the annular ring containing the rubber seal is press-fit onto the inner peripheral surface of the hub shell, removal of the old seal and installation of a new seal is very difficult. Thus, it is desirable to have a sealing system with the sealing characteristics of a rubber seal but which can be removed and replaced easily.

SUMMARY OF THE INVENTION

The present invention is directed to a seal for a bicycle hub transmission that effectively prevents entry of contaminants into the hub and also allows easy removal and replacement of the seal. In one embodiment of the present invention, a seal for a bicycle transmission includes an annular housing and an annular seal member. The housing includes a side wall that defines a plurality of circumferentially disposed slots. The seal member is retained to the housing and extends radially inwardly. The seal member is formed from a resilient material, and the housing is formed from a material that is more rigid than the seal member.

When the present invention is applied to a bicycle hub, the bicycle hub includes a hub shell that rotates around a hub axis, wherein the hub shell has at least one of a hub coupling projection and a hub coupling groove; an inner member disposed coaxially with the hub shell; a transmission for communicating a driving force to the hub shell through a plurality of transmission paths; and a seal. The seal includes an annular housing and a seal member. The housing includes a side wall having at least one of a side wall coupling projection and a side wall coupling groove engaging the at least one of the hub coupling groove or hub coupling projection, respectively. The seal member is retained to the housing, extends radially inwardly and contacts the inner member. The inner member may be a bearing cone or a driving member for providing the driving force to the hub shell.

In a more specific embodiment of a bicycle hub that incorporates the present invention, the at least one of the hub coupling projection and hub coupling groove is a hub coupling groove disposed on an outer peripheral surface of the hub shell, the at least one of the side wall coupling projection and side wall coupling groove is a side wall coupling projection disposed on an inner peripheral surface of the side wall and engaging the hub coupling groove, and the side wall defines a plurality of circumferentially disposed slots extending through an end of the side wall that is coupled to the hub shell. This structure makes it very easy to install and remove the seal from the hub shell, especially when the housing is formed from metal and the seal member is formed from rubber, since the slots allow the end of the housing to be spread apart from the hub shell.

DETAILED DESCRIPTION OF THE EMBODIMENTS

Figure 1:
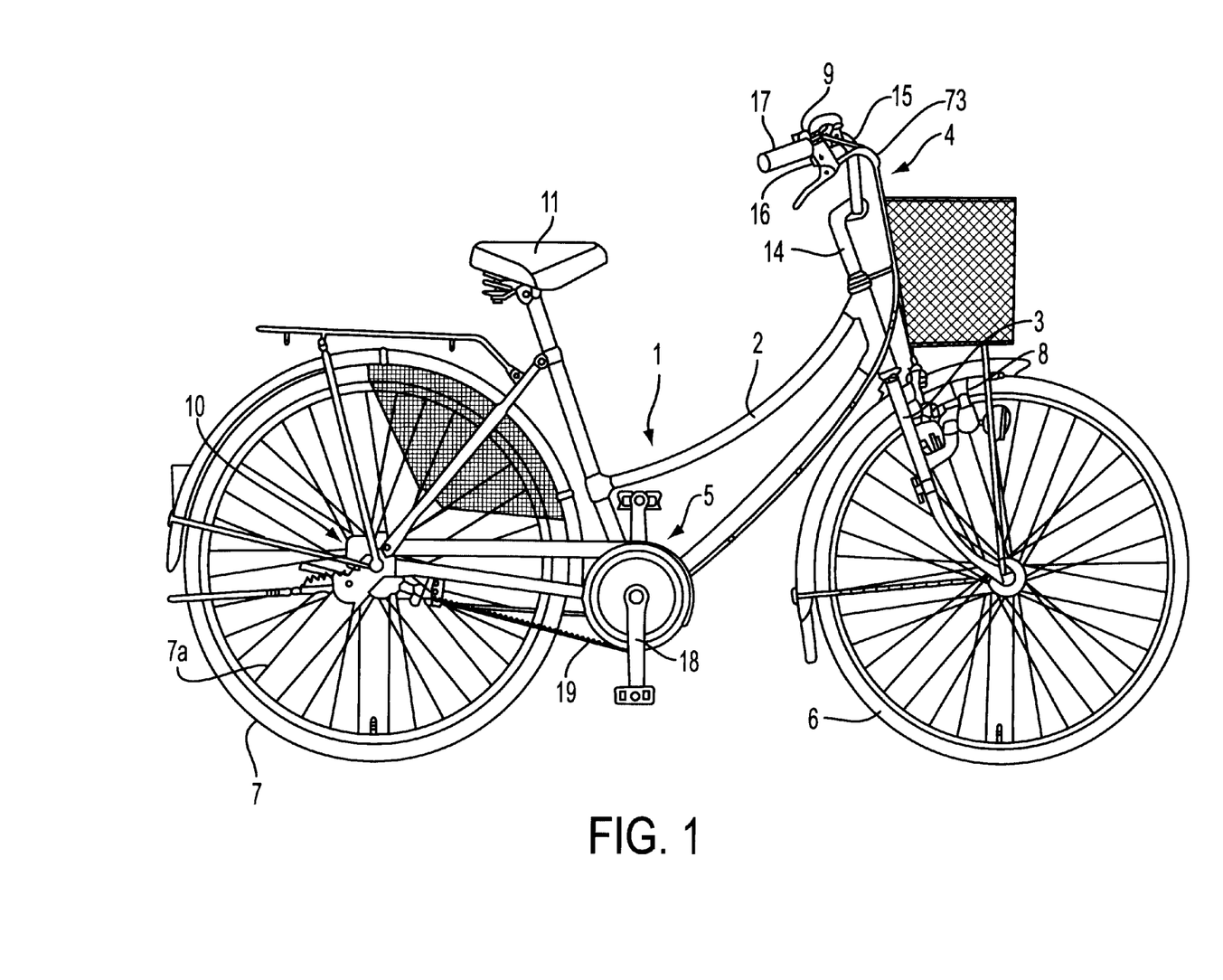
FIG. 1 is a side view of a bicycle that incorporates a particular embodiment of an internal hub transmission according to the present invention.

FIG. 1 is a side view of a bicycle that incorporates a particular embodiment of an internal hub transmission according to the present invention. This bicycle is a recreational bicycle which comprises a frame 1 having a double-loop type of frame body 2 and a front fork 3, a handle component 4, a drive component 5, a front wheel 6, a rear wheel 7 to which a three-speed internal hub transmission 10 has been mounted, a front braking apparatus 8, a gear shifter component 9 for operating the internal hub transmission 10 close at hand, and a saddle 11.

The handle component 4 has a handle stem 14 fixed to the upper portion of the front fork 3 and a handlebar 15 fixed to handle stem 14. A brake lever 16, which constitutes part of the front brake apparatus 8, a grip 17, and the gear shifter component 9 are mounted at the right end of the handlebar 15. The gear shifter component 9 is mounted on the brake lever 16 on the inside of the brake lever 16, and it is linked with internal hub transmission 10 by means of a shift control cable 73 comprising an inner cable and an outer casing formed by a spiral outer cable. The gear shifter component 9 has an ordinary structure having a winding lever for winding the inner cable and a release lever that releases the winding operation of the winding lever and plays out the inner cable, and as such it will not be described in detail herein. The drive component 5 has a gear crank 18 that is provided to the lower portion (bottom bracket portion) of the frame body 2, a chain 19 that goes around the gear crank 18, and the internal hub transmission 10.

Figure 2:
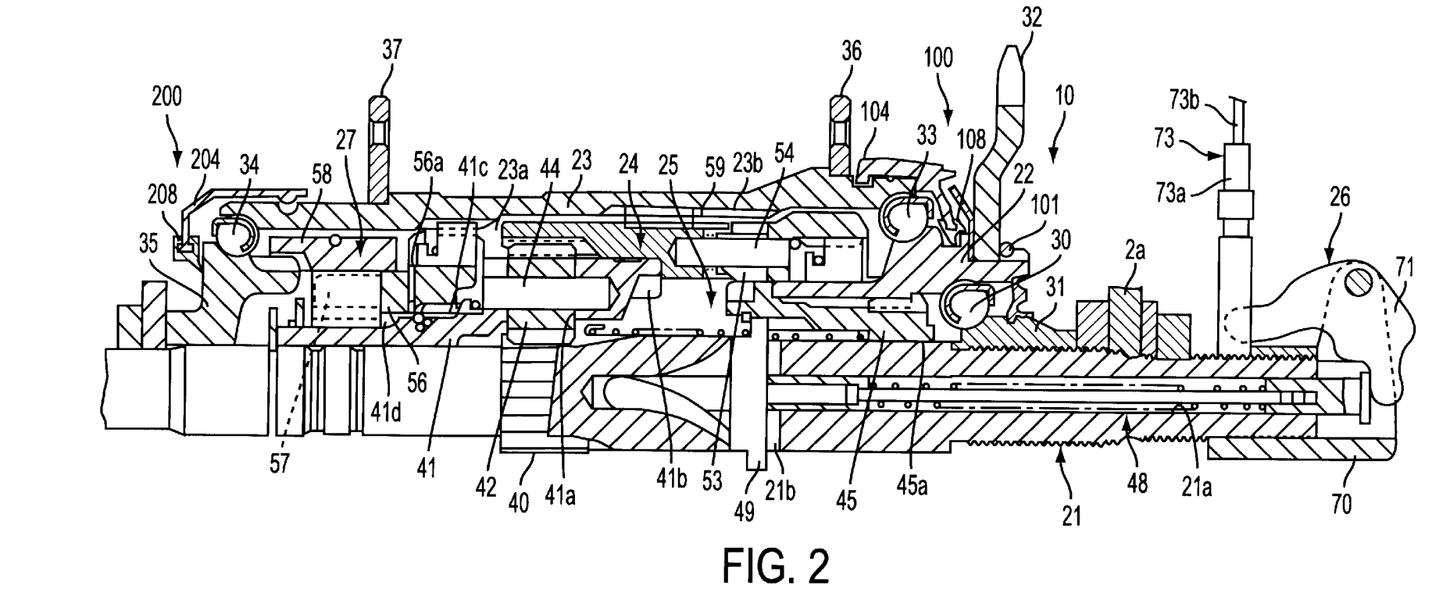
FIG. 2 is a partial cross sectional view of a particular embodiment of an internal hub transmission according to the present invention.

The internal hub transmission 10 is a coaster brake-equipped hub with a three-stage structure including power transmission paths for downshifting, direct drive, and upshifting. As shown in FIG. 2, internal hub transmission 10 has a hub axle 21 fixed to the rear dropout 2a of the frame body 2 of the bicycle, a driving member 22 disposed around the outer periphery at one end of the hub axle 21, a hub shell 23 disposed further around the outer periphery of the hub axle 21 and the driving member 22, a planet gear mechanism 24, an operation mechanism 25 for selecting a power transmission path, a bell crank 26 for actuating the operation mechanism 25, and a coaster brake 27.

Figure 3:
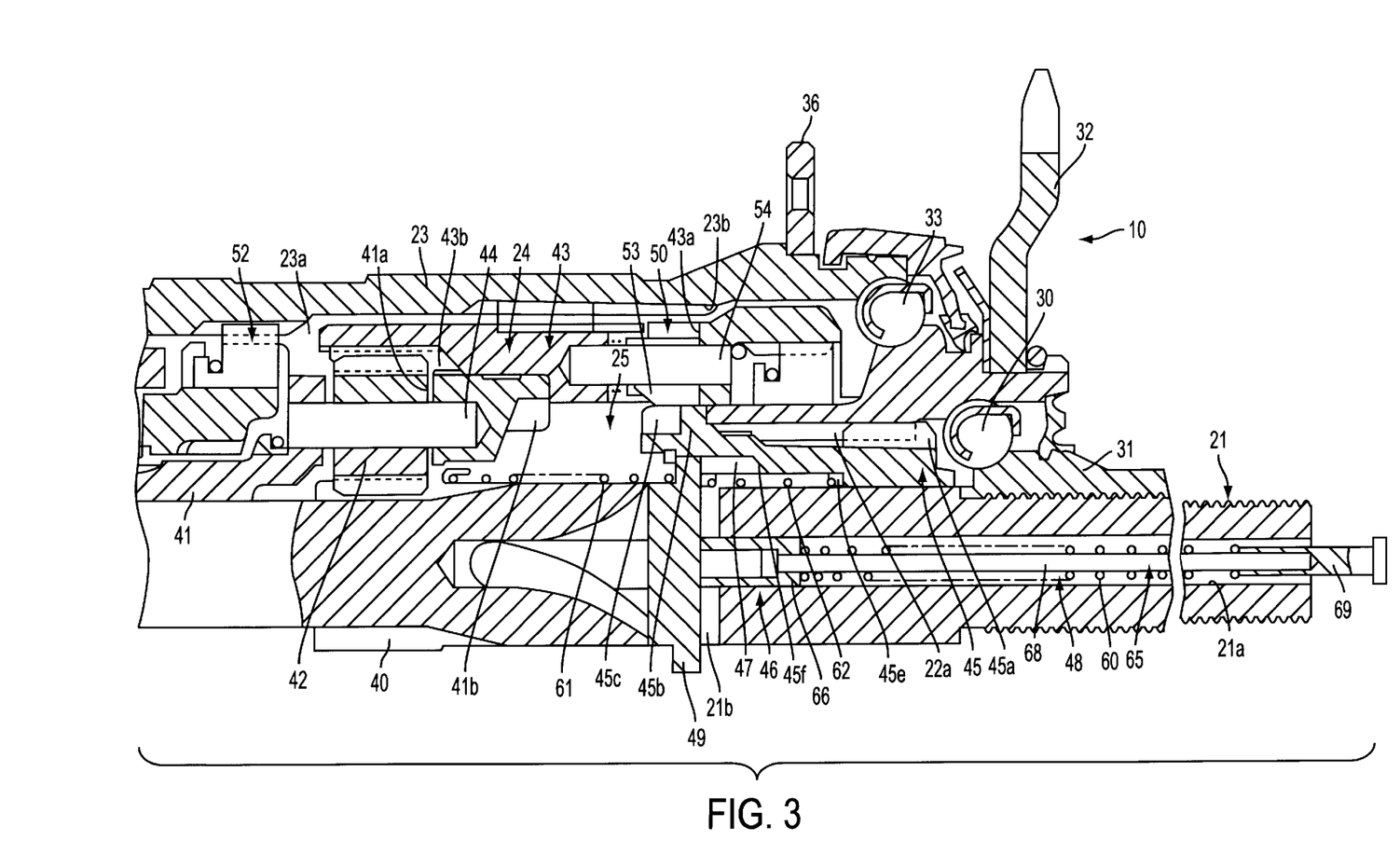
FIG. 3 is an enlarged detail view of the internal hub transmission of FIG. 2 in a low speed position.

As shown in FIGS. 2 and 3, the hub axle 21 is a rod-like member which has a larger diameter in its middle and a smaller diameter at both ends. Threads are formed at both ends of hub axle 21. An operation hole 21a is formed in the axial portion of the hub axle 21 from the right end to the center in FIG. 2, and a through-groove 21b is formed in the vicinity of the bottom of the operation hole 21a. The through-groove 21b goes through the axis of the hub axle 21 and is inclined by a specific groove inclination angle β (see FIG. 5) with respect to the axle axis. The through-groove 21b is formed in a twist to the side opposite the forward direction going from the right to the left in FIG. 5. Through-groove 21b is formed by using an end drill of a specific diameter to form holes that go through the axis, and then by feeding the drill toward the center in the axial direction while the hub axle 21 is slowly rotated in the forward direction. Therefore, through-groove 21b is shaped as a continuous spiral in which the through-holes intersecting at both ends rotate gradually according to movement in the axial direction. The groove inclination angle β should range from 10 to 50 degrees.

One end of the driving member 22 is rotatably supported on the hub axle 21 via balls 30 and a hub cone 31, and a hub cog 32 is fixed around the outer periphery of driving member 22 at one end by a snap ring 101. A plurality of serration inner teeth 22a are formed in the axial direction around the inner periphery at the other end of the driving member 22. The hub shell 23 is a tubular member, and a housing space 23a around the inner periphery thereof houses the driving member 22 and the planet gear mechanism 24. The hub shell 23 is able to rotate around the hub axle 21 via balls 33 and 34 and a hub bearing cone 35. Flanges 36 and 37 for supporting spokes 7a (see FIG. 1) are fixed at both ends of the outer periphery of the hub shell 23. A driving member seal 100 comprising an annular housing 104 coupled to hub shell 23 and an annular seal member 108 contacting driving member 22 is disposed on the right side of internal hub transmission 10. Similarly, a cone seal 200 comprising an annular housing 204 coupled to hub shell 23 and an annular seal member 208 contacting cone 35 is disposed on the left side of internal hub transmission 10.

The planet gear mechanism 24 has a sun gear 40 formed coaxially and integrally with the hub axle 21, a gear frame 41 disposed around the outer periphery of the hub axle 21, three planet gears 42 (only one planet gear is shown in the figure) that mesh with the sun gear 40, and a ring gear 43. The gear frame 41 is a tubular member, and it is rotatably supported on the hub axle 21. Three notches 41a are formed in the circumferential direction in the gear frame 41, and the planet gears 42 are rotatably supported by pins 44 in these various notches 41a. Serration inner teeth 41b are formed around the inner periphery at one end of the gear frame 41, and serration outer teeth 41c (FIG. 2) are formed around the outer periphery at the other end.

Figure 4:
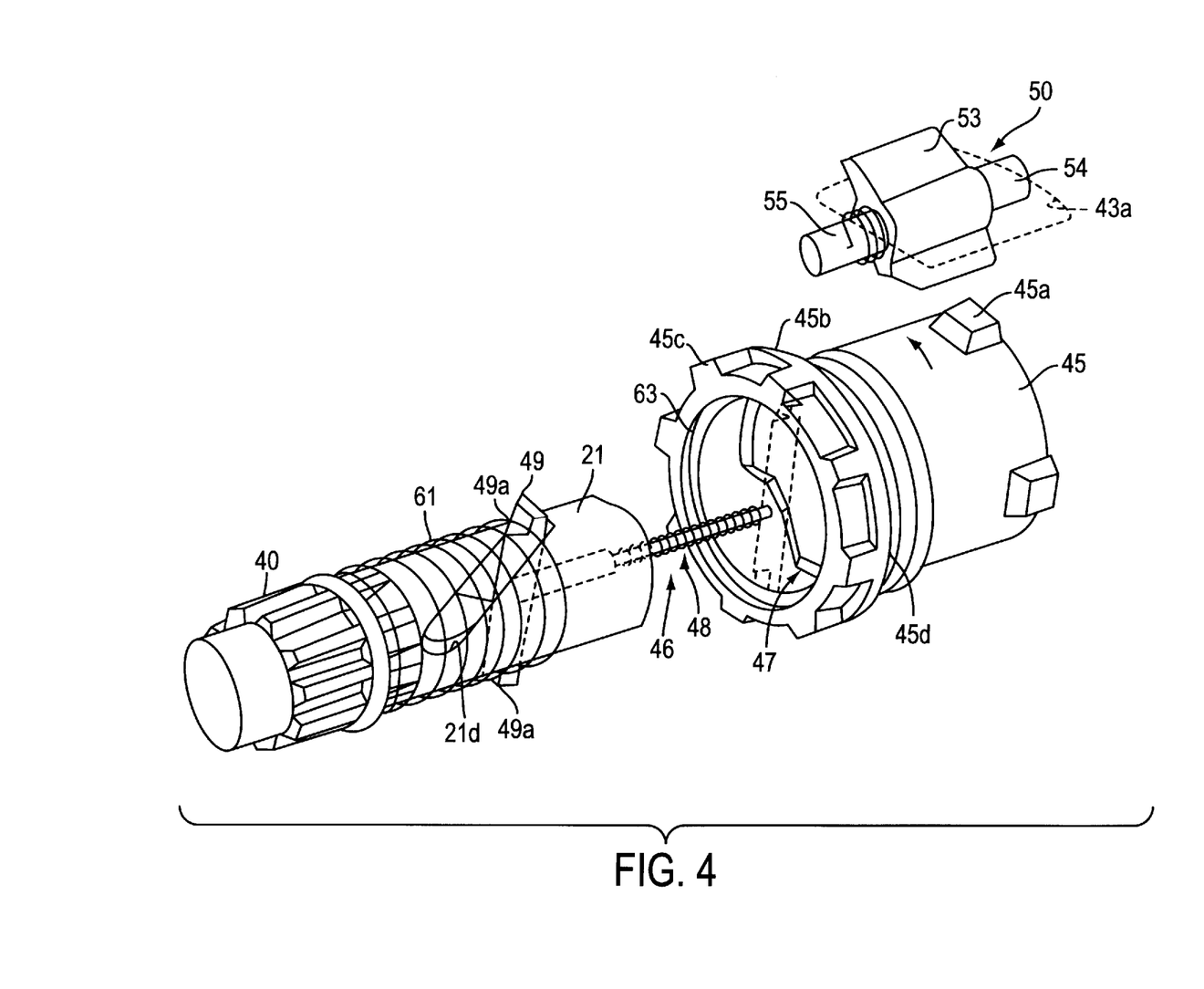
FIG. 4 is an oblique view of an operation mechanism used in the internal hub transmission shown in FIG. 2.

The ring gear 43 is formed in a nearly cylindrical shape, and it extends from the planet gears 42 to the outer periphery of the driving member 22. Inner teeth 43b are formed around the inner periphery at the other end of the ring gear 43. The planet gears 42 mesh with the sun gear 40 as mentioned above, but at the same time also mesh with the inner teeth 43b of the ring gear 43. A notch 43a is formed at one end of the ring gear 43, and a clutch pawl 53 that makes up part of a first one-way clutch 50 as shown in FIG. 4 is swingably supported by a pin 54 in this notch 43a. This clutch pawl 53 is biased in the standing direction by a torsion coil spring 55 (FIG. 4). The first one-way clutch 50 transmits only rotational drive force in the forward direction from the ring gear 43 to the hub shell 23. The clutch pawl 53 meshes with the ratchet teeth 23b formed on the inner peripheral surface of the hub shell 23 only when the ring gear 43 has rotated in the forward direction. Even when in a transmission-enabled state in which the ring gear 43 rotates in the forward direction, this first one-way clutch 50 is able to switch between a power transmission state in which the clutch pawl 53 meshes with the ratchet teeth 23b and a transmission cutoff state of retraction from the ratchet teeth 23b, which is accomplished by the movement of the clutch member as discussed below.

A second one-way clutch 51 that transmits rotational drive force only in the forward direction from the driving member 22 to the ring gear 43 is arranged between the driving member 22 and the ring gear 43. A third one-way clutch 52 that transmits rotational drive force only in the forward direction from the gear frame 41 to the hub shell 23 is arranged between the gear frame 41 and the hub shell 23. The third one-way clutch 52 has a tubular clutch case 56 in which serration inner teeth 56a are formed around the inner periphery at one end. These serration inner teeth 56a engage with the serration outer teeth 41c of the gear frame 41, and the clutch case 56 rotates integrally with the gear frame 41. These two one-way clutches 51 and 52 are unable to perform switching in a transmission-enabled state, unlike the first one-way clutch 50.

The operation mechanism 25 is used to select the power transmission path, and it comprises a clutch member 45 and a clutch control component 46. The clutch member 45 switches the driving member 22 and gear frame 41 between a linked state and a separated state, and it also switches the first one-way clutch 50 between a power transmission state and a power cutoff state. The clutch member 45 is positioned around the outer periphery of the hub axle 21 such that it can rotate and move in the axial direction.

As shown in FIG. 4, the clutch member 45 is a tubular member, and it has serration outer teeth 45a formed around the outer periphery at one end thereof The serration outer teeth 45a are slidably engaged with the serration inner teeth 22a of driving member 22. A large diameter component 45b is formed at the other end of the clutch member 45, and serration outer teeth 45c are formed around the outer periphery thereof. The serration outer teeth 45c are able to engage with the serration inner teeth 41b formed on the gear frame 41. A taper surface 45d is formed between the large diameter component 45b and one end. This taper surface 45d is provided in order to lower the clutch pawl 53 of the first one-way clutch 50 from its erected position (power transmission position) indicated by the solid line to its retracted position (power cutoff position) indicated by the two-dot chain line. When the clutch member 45 moves from the left to the downshift position on the right end, the clutch pawl 53 follows along the taper surface 45d, rides up onto the large diameter component 45b, and is lowered into a retracted attitude.

Figure 5:
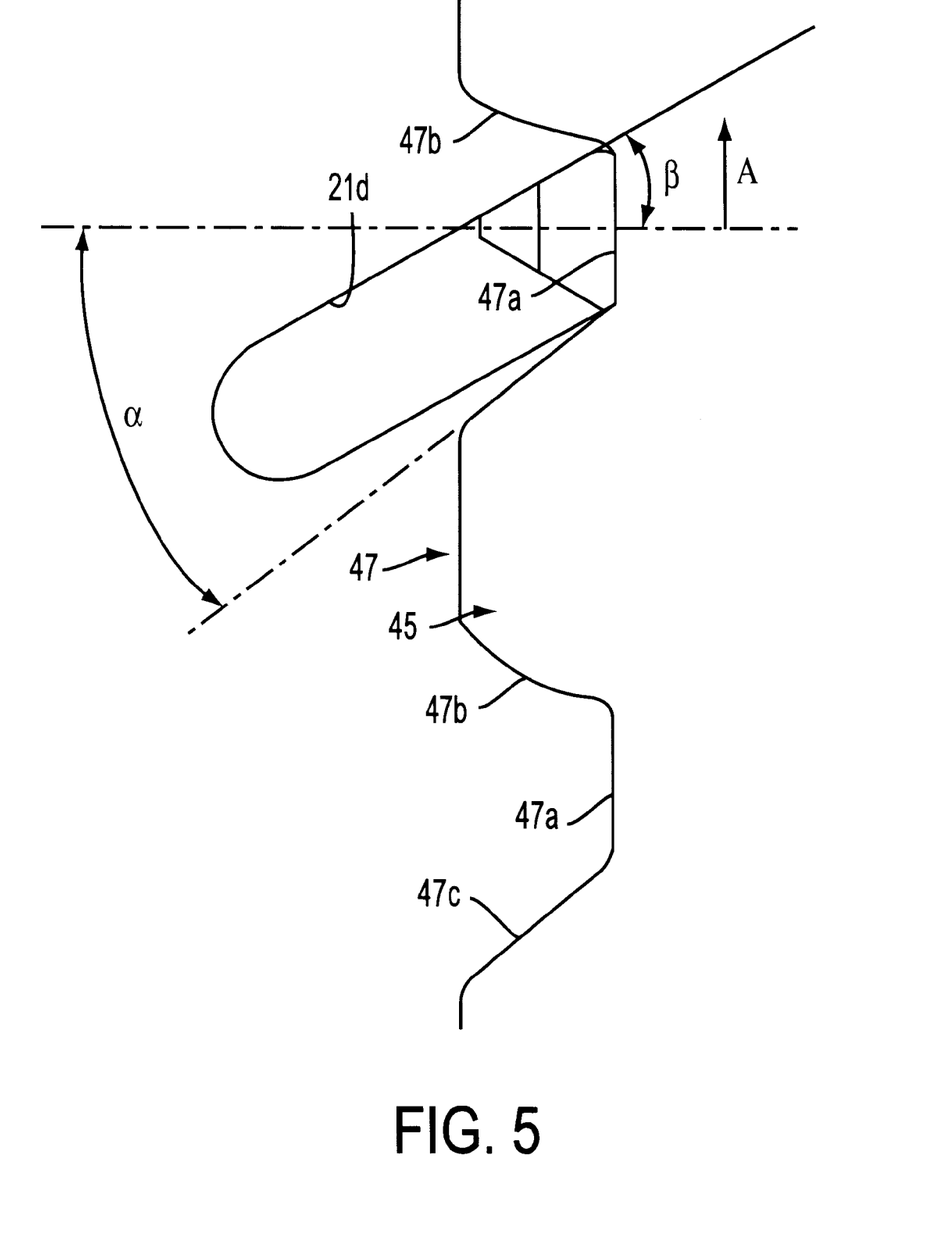
FIG. 5 is a schematic view illustrating the operation of the shift key and cam surface shown in FIG. 4.

As shown in FIG. 3, two stepped components 45e and 45f are formed around the inner periphery of the clutch member 45 with spaces between them in the axial direction. As shown in FIG. 4, a plurality of cam surfaces 47 are formed on the left step component 45f with spaces between them in the circumferential direction. As shown in FIG. 5, the cam surfaces 47 have a flat surface 47a that is depressed at one end, a curved surface 47b that leads downstream in the forward direction A of the flat surface 47a, and an inclined surface 47c that leads upstream. The inclination angle α with respect to the axle axis of this inclined surface 47c should be greater than the groove inclination angle β of the through-groove 21b, and between 20 and 70 degrees.

The clutch control component 46 moves the clutch member 45 in the axial direction of the hub axle 21, and it engages with the clutch member 45 to convert the rotational drive force of the clutch member 45 into displacement in the axial direction. The clutch control component 46 has a push rod 48 that moves in the axial direction through the operation hole 21a and a shift key 49 that is pressed to the gear frame 41 side by the push rod 48, as shown in FIG. 3.

Figure 6:
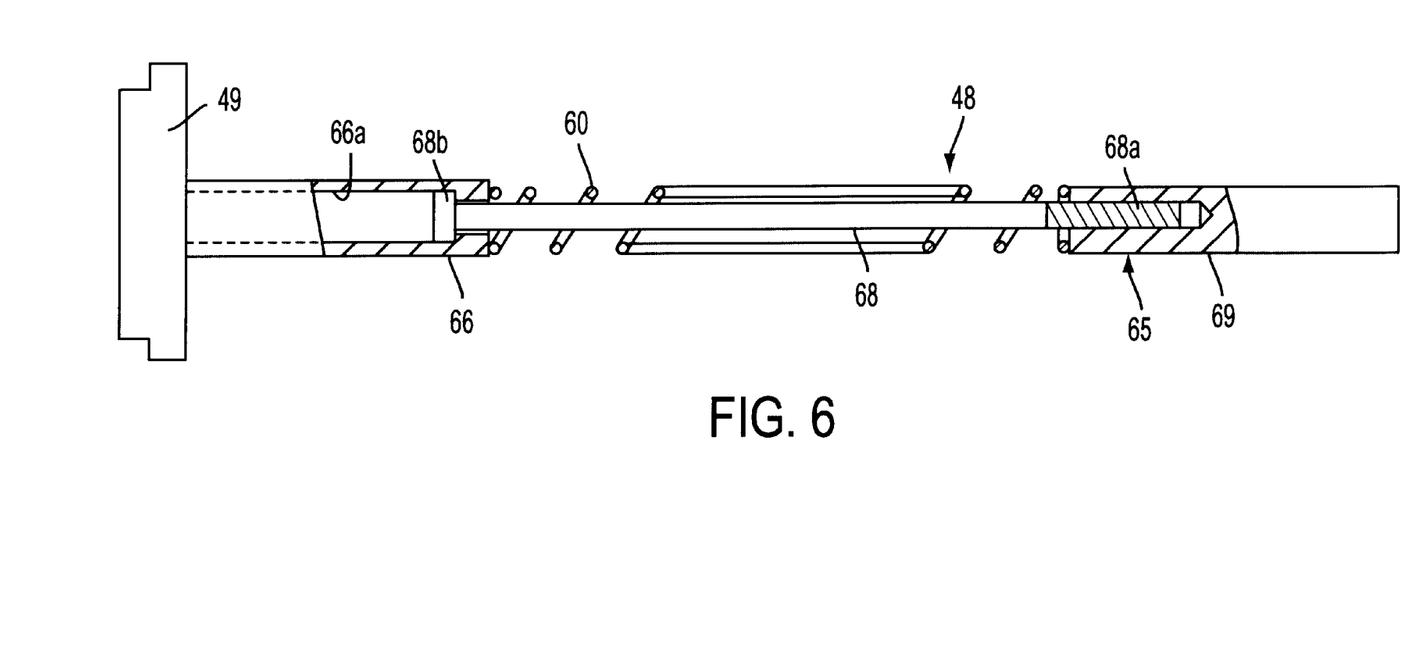
FIG. 6 is a detailed view of the push rod assembly shown in FIG. 4.

As shown in FIG. 6, the push rod 48 has an operator 65 of a specific length, an actuator 66 that is mounted on the distal end of the operator 65 such that the former can move in the axial direction, and a first coil spring 60 that is positioned between the operator 65 and the actuator 66. The operator 65 has a rod component 68 and a strike component 69 threaded onto the rod component 68. A threaded component 68a is formed on the base end of the rod component 68, and a large diameter component 68b is formed on the distal end. This threaded component 68a is threaded into the strike component 69. The large diameter component 68b is slidably mounted in a guide hole 66a formed in the interior of the actuator 66. The guide hole 66a has a smaller diameter on the actuator 66 side, which keeps the actuator 66 from coming out. The first coil spring 60 is inserted in a compressed state between the end surface of the actuator 66 and the end component of the strike component 69, and it biases the actuator 66 and the operator 65 away from each other. Thus, when the actuator 66 presses on the shift key 49, the clutch member 45 is biased toward the gear frame 41.

As shown in FIG. 4, the shift key 49 is a rod-like member with a triangular cross section. When pressed, shift key 49 moves through the through-groove 21b while turning in the opposite direction from the forward direction, that is, while twisting. The contact surface of the shift key 49 against the through-groove 21b is formed at an angle that follows the through-groove 21b. For example, when the inclination angle β of the through-groove 21b is 30 degrees, the angle of the contact surface 49b with respect to the axis is also about 30 degrees. In this embodiment, the movement of the shift key 49 is restricted to being within the clutch member 45 by a stop ring 63 mounted around the inner periphery at the other end of the clutch member 45. Therefore, the shift key 49 cannot actually come out of the clutch member 45 as shown in FIG. 4. Instead, the shift key 49 contacts stop ring 63 and moves the clutch member 45 to the left in FIG. 3.

On the other hand, the shift key 49 is able to strike the cam surfaces 47 inside the clutch member 45. If the clutch member 45 is rotated in the forward direction in a state in which the shift key 49 has struck the flat component 47a of the cam surface 47, then the shift key 49 is pressed to the guide surface of the through-groove 21b by the inclined surface 47c of the cam surface 47. As a result, the clutch member 45 moves to the right in the axial direction. Specifically, the rotational drive force of the clutch member 45 is converted into displacement in the axial direction to assist shift control.

A notch 49a is formed at both ends of the shift key 49, and against this notch 49a is stopped a second coil spring 61 that is stopped at its other end on the hub axle 21. The shift key 49 is constantly biased toward the clutch member 45 by this second coil spring 61. A third coil spring 62 is interposed between the shift key 49 and the clutch member 45. The third coil spring 62 is restricted to a specific overall length by a restricting member (not shown). When compressed, third coil spring 62 biases the shift key 49 and the clutch member 45 away from each other before the former strikes the latter. As a result, the clutch member 45 ordinarily remains at a constant distance from the shift key 49 during movement, and is accurately positioned.

In this embodiment, the biasing forces of the first through third coil springs 60, 61, and 62 decrease in that order. If the spring force of the first coil spring 60 were less than that of the second coil spring 61, then even if the shift key 49 is pressed by the push rod 48, the first coil spring 60 would contract and the shift key 49 would not move. If the spring force of the second coil spring 61 were less than that of the third coil spring 62, then even if the shift key 49 is pressed by the second coil spring 61, the shift key 49 would not go into the cam surface 47, and shift control would not be assisted.

The first coil spring 60 is positioned in a relatively large space between the operator 65 and the actuator 66 inside the operation hole 21a, so it is possible to increase the number of coils and thereby lower the spring constant and the spring force. Accordingly, the spring constants and spring forces of the second and third coil springs 61 and 62 can be further lowered, allowing a reduction in the overall force required to press the push rod 48 during an upshift. This, in turn, would decrease the operating force of the winding lever in the shift control component 9. As a result, there is less tension on the inner cable, and the inner cable does not break as frequently.

The bell crank 26 is mounted at the axial end of the hub axle 21. The bell crank 26 comprises a support bracket 70 mounted at the axial end and a link member 71 swingably supported by the support bracket 70. The outer casing 73a of a shift control cable 73 is stopped at this support bracket 70, and an inner cable 73b is stopped at the link member 71. The distal end of the link member 71 strikes the base end of the push rod 48. Pulling the inner cable 73b by means of the shift control component 9 swings the link member 71, presses the push rod 48, and executes an upshift. When the inner cable is slackened, the clutch member 45 is pressed by the second coil spring 61 via the shift key 49, and a downshift is executed.

As shown in FIG. 2, the coaster brake 27 is mounted to the clutch case 56. The coaster brake 27 comprises a brake roller 57 supported by the clutch case 56, a cam surface 41d formed around the outer periphery at the other end of the gear frame 41, and a brake shoe 58 that exerts a braking action on the inner surface at the other end of the hub shell 23. The brake roller 57 is designed such that it is pushed outward in the radial direction by the cam surface 41d when the driving member 22 rotates in the reverse direction. As a result, the brake shoe 58 comes into contact with and brakes the inner surface of the hub shell 23.

Brake lock tends to occur when the coaster brake 27 is installed. Brake lock is a phenomenon whereby if the first one-way clutch 50 is in a power transmission state when the rider pedals backward to brake, the drive force will be transmitted in a state in which the brake is applied, and the brake cannot be released. A pawl cage 59 is mounted to the first one-way clutch 50 in this embodiment in order to prevent this phenomenon. The pawl cage 59 provides a specific angle of play between the ratchet teeth 23b of the hub shell 23 and the clutch pawl 53 of the first one-way clutch 50, and it allows the brake to be released while the ring gear 43 rotates by this amount of play. Specifically, the pawl cage 59 either prevents the clutch pawl 53 from being erected at a specific angle, or, even if it is erected, allows it to be erected at a position where it cannot stop the ratchet teeth 23b at the specific angle, and delays the time when the clutch pawl 53 is stopped by the ratchet teeth 23b during initial drive.

Because of the planet gear mechanism 24 and one-way clutches 50 to 52, this internal hub transmission 10 has:
- a downshift power transmission path made up of the driving member 22, the ring gear 43, the planet gear mechanism 24, the gear frame 41, and the hub shell 23;
- a direct drive power transmission path made up of the driving member 22, the ring gear 43, and the hub shell 23, and
- an upshift power transmission path made up of the driving member 22, the clutch member 45, the gear frame 41, the planet gear mechanism 24, the ring gear 43, and the hub shell 23.

Shifting is performed by operating the push rod 48 with the bell crank 26 via the shift control cable 73. In the state shown in FIG. 3, in which the push rod 48 is not pushed in, the clutch member 45 is disposed in the downshift position at the right end, and the rotation from the driving member 22 is transmitted to the hub shell 23 after being reduced in speed via the downshift power transmission path. More specifically, the rotation input to the driving member 22 is transmitted to the ring gear 43 via the second one-way clutch 51. At this point, the clutch pawl 53 of the first one-way clutch 50 is rotated by the clutch member 45 to the retracted attitude shown by the two-dot chain line in FIG. 4, and the first one-way clutch 50 is in a power cutoff state. Accordingly, the rotation transmitted to the ring gear 43 is further transmitted to the hub shell 23 via the planet gear mechanism 24, the gear frame 41, and the third one-way clutch 52. In this case, the input rotation is reduced in speed according to the gear shift ratio determined by the numbers of teeth of the sun gear 40, the planet gears 42, and the ring gear 43.

Figure 7:
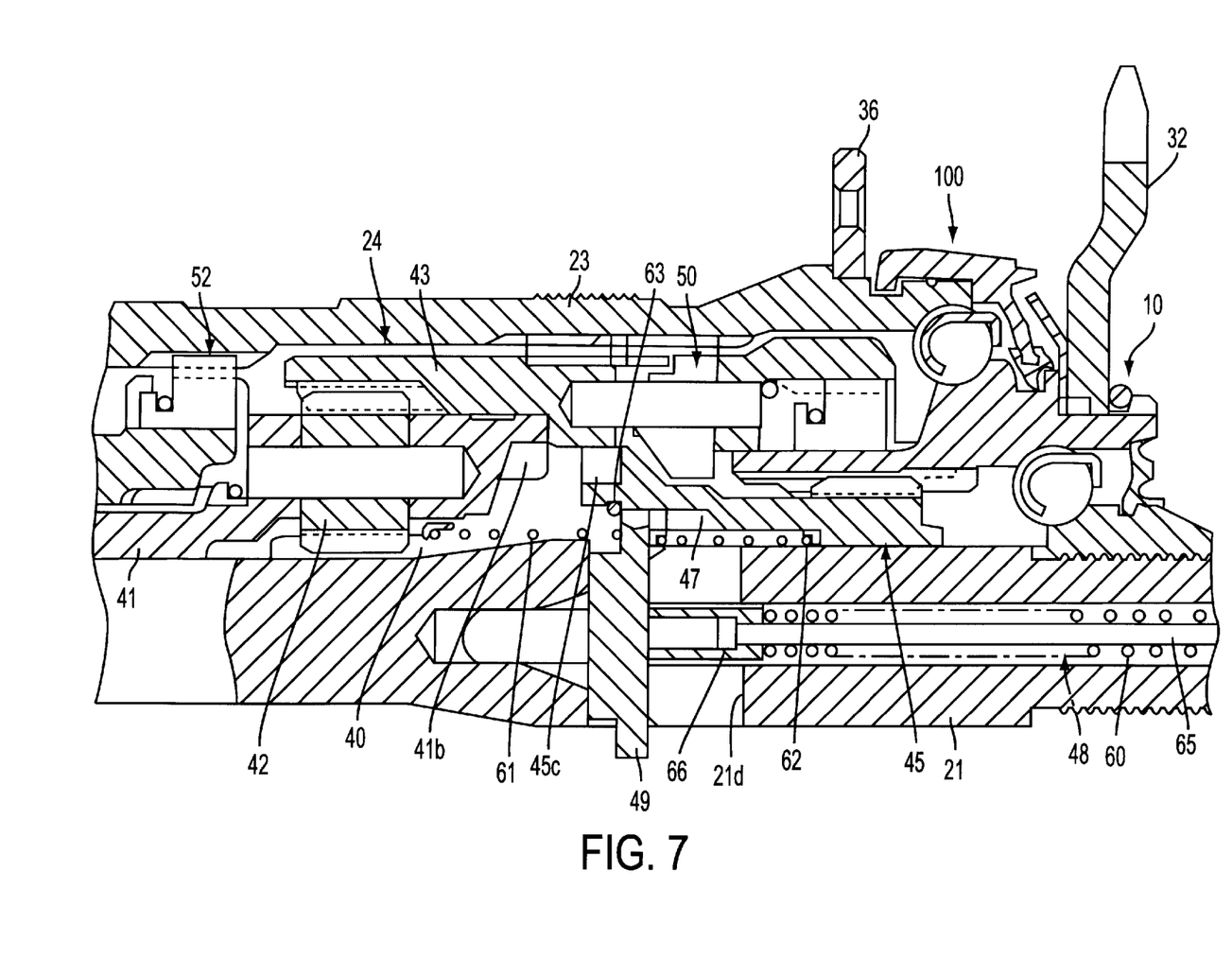
FIG. 7 is an enlarged detail view of the internal hub transmission of FIG. 2 in a direct drive position.

If the winding lever of the shift control component 9 is operated, the link member 71 of the bell crank 26 swings and pushes in the push rod 48 by one stage. As a result, since the spring force of the first coil spring 60 is greater than the spring force of the second coil spring 61, the shift key 49 is pushed by the link member 71 via the push rod 48, guided into the through-groove 21b, and moved to the left in FIG. 3 while rotating around the hub axle. The clutch member 45 is also pushed via the stop ring 63 and assumes the direct drive position. Once the clutch member 45 is disposed in the direct drive position shown in FIG. 7, the clutch pawl 53 of the first one-way clutch 50, which had been put into a retracted attitude by the taper surface 45d, is returned to the erected attitude shown by the solid line in FIG. 4 by the spring force of the torsion coil spring 55. In this state, the first one-way clutch 50 is able to transmit only rotation in the forward direction from the ring gear 43 to the hub shell 23. Therefore, the rotation from the driving member 22 is directly transmitted to the hub shell 23 through the direct drive power transmission path. More specifically, the rotation input to the driving member 22 is transmitted to the ring gear 43 via the second one-way clutch 51, then is transmitted to the hub shell 23 via the first one-way clutch 50, and the rotation of the driving member 22 is transmitted directly to the hub shell 23 via the ring gear 43. At this point, the rotation is transmitted from the ring gear 43 to the gear frame 41 via the planet gear mechanism 24, and the gear frame 41 rotates at reduced speed, but since the rotation of the hub shell 23 is faster than that of the gear frame 41, there is no transmission of the rotation from the gear frame 41 to the hub shell 23 via the third one-way clutch 52.

When the winding lever is operated from the direct drive state and the push rod 48 is pushed in further, the shift key 49 moves further to the left, and the clutch member 45 also moves correspondingly to the upshift position. When the clutch member 45 is disposed in the upshift position shown in FIG. 8, the serration outer teeth 45c of the clutch member 45 and the serration inner teeth 41b of the gear frame 41 mesh with each other. In this movement to the upshift position, when the serration outer teeth 45c and the serration inner teeth 41b are disposed in the positions where they mesh, the clutch member 45 moves directly to the upshift position to the left after the clutch member 45 strikes the gear frame 41. When, however, these teeth are disposed in positions where they do not mesh, the shift key 49 and the clutch member 45 temporarily halt their movement to the left at the point when the clutch member 45 strikes the gear frame 41. When this happens, the actuator 66 of the push rod 48 retracts, the first coil spring 60 is compressed, and the shift key 49 is pressed. When the clutch member 45 then rotates and the two sets of teeth 45c and 41b reach their meshing positions, the spring force of the first coil spring 60 moves the clutch member 45 via the shift key 49, and the two sets of teeth 45c and 41b mesh.

In this state, the rotation transmitted to the driving member 22 is transmitted to the hub shell 23 via the upshift transmission path. More specifically, rotation is transmitted from the driving member 22, through the clutch member 45 and to the gear frame 41. The rotation transmitted to the gear frame 41 is transmitted to the hub shell 23 via the planet gear mechanism 24, the ring gear 43, and the first one-way clutch 50. In this case, the input rotation is increased in speed and output according to the gear shift ratio determined by the numbers of teeth of the sun gear 40, the planet gears 42, and the ring gear 43. There is an attempt at this point to transmit the rotation from the driving member 22 toward the ring gear 43 via the second one-way clutch 51, but since the rotation of the ring gear 43 is faster than that of the driving member 22, no rotation is transmitted from the second one-way clutch 51.

Since rotation is transmitted directly between the driving member 22 and the ring gear 43 during such a shift from the downshift side to the upshift side, it is best to move the clutch member 45, which has no force acting upon it. Accordingly, the spring force of the first coil spring 60 for pushing the clutch member 45 may be reduced, and furthermore, since the spring force of the second coil spring 61 is lower than this, shift operation can be performed with a light force.

Figure 8:
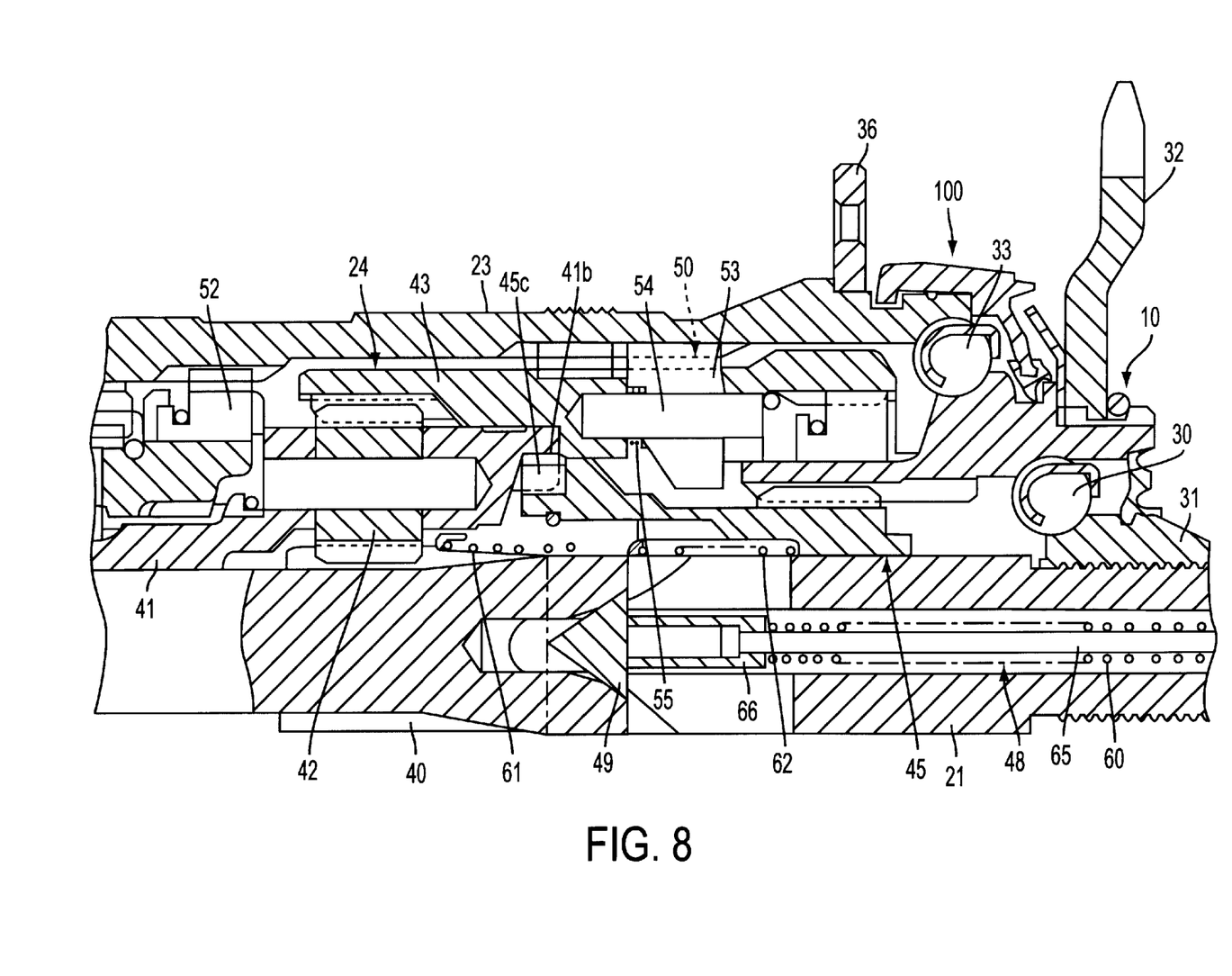
FIG. 8 is an enlarged detail view of the internal hub transmission of FIG. 2 in a high speed position.

When the release lever of the shift control component 9 is operated at the upshift position shown in FIG. 8, the biasing force of the first coil spring 60 is removed, and the second coil spring 61 presses on the shift key 49 and causes the push rod 48 to retract by one stage to the right. The shift key 49 then presses on the clutch member 45 via the third coil spring 62 and attempts to move the clutch member 45 to the direct drive position. When the rider is not pedaling and no drive force is being transmitted, the clutch member 45 readily separates from the gear frame 41, and the clutch member 45 moves to the direct drive position. If the rider is pedaling, however, since drive force is being transmitted from the clutch member 45 to the gear frame 41, frictional force may cause the serration inner teeth 41b and the serration outer teeth 45b to remain meshed. In a case such as this, the spring force of the second coil spring 61 alone will not move the clutch member 45 to the right in FIG. 8. In a state such as this, when the shift key 49 strikes the flat surface 47a of the cam surface 47 of the clutch member 45 as shown in FIG. 5, the shift key 49 is pressed to the guide surface over the entire length of the portion inserted in the through-groove 21b, and it is prevented by frictional force from escaping in the axial direction. As a result, when the shift key 49 rides up on the inclined surface 47c, the clutch member 45 moves to the right. When the serration inner teeth 41b and the serration outer teeth 45c are then unmeshed, the clutch member 45 is pressed by the second coil spring 61 via the shift key 49 and moves to the direct drive position. In other words, contact between the cam surface 47 of the clutch member 45 and the shift key 49 assists shifting by converting the rotational motion of the clutch member 45 into displacement in the axial direction.

The shift key 49 cannot readily escape to the left in the axial direction as mentioned above because it is pressed by the second coil spring 61, and the through-groove 21b is inclined and twisted in a spiral with respect to the axis. Therefore, the shift key 49 will not escape in the axial direction when the transmitted drive force is less than the biasing force of the second coil spring 61 and the frictional force between the shift key 49 and the guide surface. However, when a drive force greater than these is applied, the shift key 49 may overcome the biasing force of the second coil spring 61 and the frictional force with the guide surface and escape to the left in the axial direction without the clutch member 45 moving. The frictional force here can be set by means of the groove inclination angle β. If this groove inclination angle β is set too high, then it will be difficult for the shift key 49 to move to the left when the shift key 49 is pushed by the push rod 48. If the groove inclination angle β is set too low, however, the resistance will be smaller during pushing by the push rod 48, but the frictional force will also decrease. Therefore, the groove inclination angle β should be between 10 and 50 degrees. It is possible to adjust the drive force at the limit where the shift key 49 escapes during assist by adjusting this groove inclination angle β, the inclination angle α of the inclined surface 47c of the cam surface 47, and the spring force of the three coil springs 60 to 62.

Even when a drive force larger than the set drive force is applied and the shift key 49 escapes in the axial direction without the clutch member 45 moving, once the gear crank 18 reaches the vicinity of top dead center or bottom dead center and the drive force decreases, the clutch member 45 will be pressed by the assist force produced by the shift key 49 and will move to the right. Accordingly, a shift will not be performed when an extremely large drive force is applied, such as on a steep hill, which reduces shifting shock and helps prevent damage to the drive force transmission parts, such as the serration teeth and the one-way clutches. When the clutch member 45 finally moves, the shift key 49 is separated from the cam surface 47 by the third coil spring 62. Accordingly, there will be no noise generated by contact with the shift key 49 even if the clutch member 45 is rotated. In the direct drive position shown in FIG. 7, rotation is transmitted from the driving member 22 to the hub shell 23 via the direct drive transmission path, as discussed above.

When the release lever is operated in a state in which the clutch member 45 is disposed in the direct drive position, the push rod 48 retracts further, and the shift key 49 presses on the clutch member 45. At this point the taper surface 45d of the clutch member 45 comes into contact with the clutch pawl 53 of the first one-way clutch 50 and attempts to lower the clutch pawl 53 from an erected attitude to a retracted attitude. However, because the clutch pawl 53 is transmitting power from the ring gear 43 to the hub shell 23, it is not readily lowered to a retracted attitude by the biasing force of the second coil spring 61 alone. Here again, when the shift key 49 strikes the cam surface 47 of the clutch member 45, an assist force is generated just as discussed above, the clutch member 45 is moved in the axial direction, and the clutch pawl 53 can be lowered.

Since rotation is transmitted directly to the ring gear 43, without going through the clutch member 45, there is a reduction in the operating force required during shifting in an upshift operation from the downshift side to the upshift side. Furthermore, since the rotational force of the clutch member 45 is assisted by being converted into displacement in the axial direction in a downshift operation from the upshift side to the downshift side, the rider can make a shift with a light force while still pedaling, even when upshifting.

Figure 9:
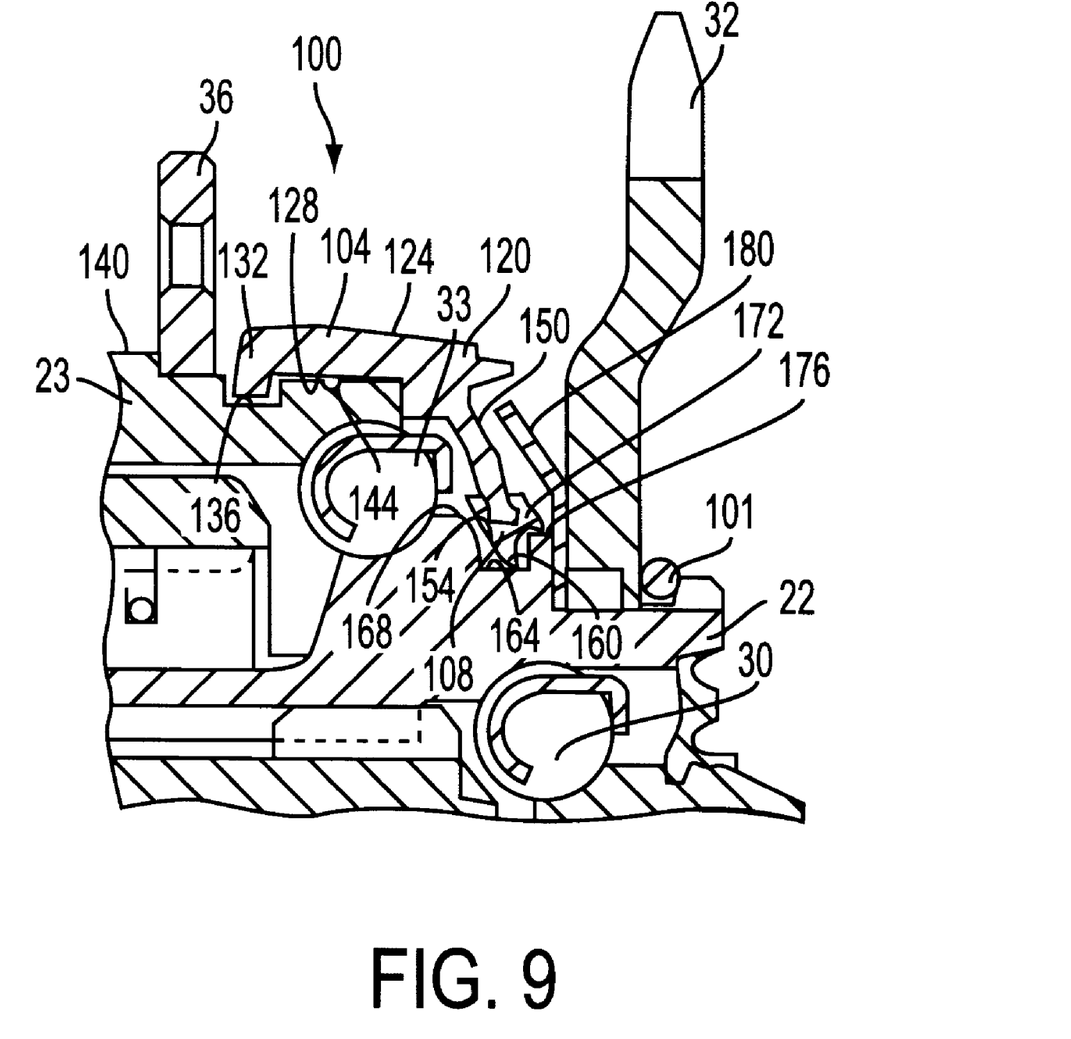
FIG. 9 is a more detailed view of the driving member seal shown in FIG. 2.
Figure 10:
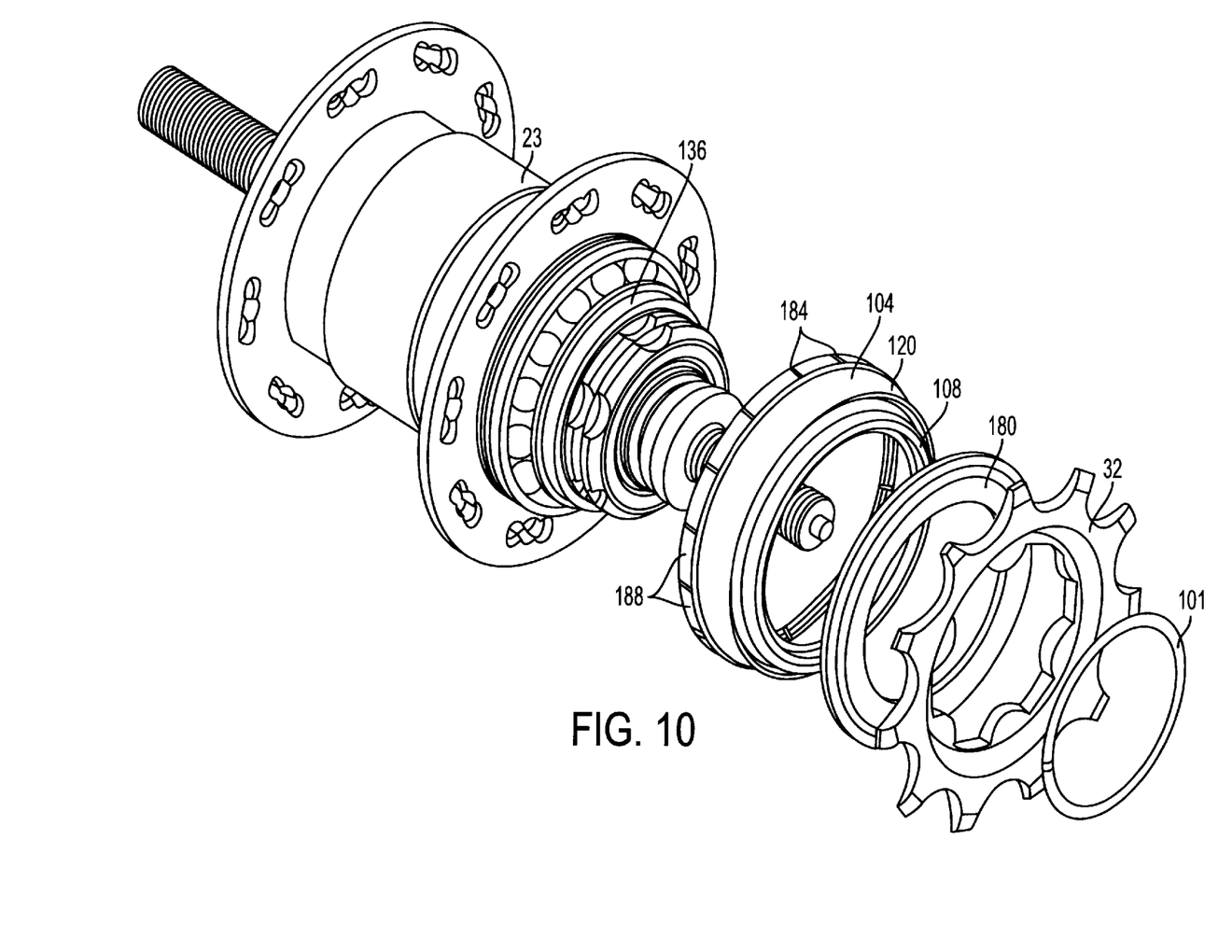
FIG. 10 is a partially exploded view of the internal hub transmission showing the driving member seal.

FIG. 9 is a more detailed view of the driving member seal 100 shown in FIG. 2, and FIG. 10 is a partially exploded view of the internal hub transmission 10 showing the driving member seal 100. As shown in those Figures, annular housing 104 includes a cylindrical metal side wall 120 having an outer peripheral surface 124 and an inner peripheral surface 128. Side wall 120 has a coupling wall or projection 132 engaging a hub coupling groove 136 formed on an outer peripheral surface 140 of hub shell 23. A grease retaining groove 144 also is formed on the outer peripheral surface of hub shell 23 to the right of hub coupling groove 136. A seal coupling wall or projection 150 extends radially inwardly from side wall 124 for engaging a complementary seal coupling groove 154 formed in the upper portion of seal member 108.

In this embodiment, seal member 108 is a rubber member retained to the inner peripheral surface of housing 104. An inner peripheral surface of seal member 108 forms a first lip 160 extending radially inwardly and contacting driving member 22 within a seal groove 164 formed on an outer peripheral surface 168 of driving member 22. Seal member 108 also forms a second lip 172 extending in a different direction from first lip 160 for contacting a ledge 176 formed by the outer peripheral surface 168 of driving member 22. The two lips 160 and 172 form a very effective seal against outside contaminants. An annular dust cap 180 is further provided between hub cog 32 and seal 100 to provide even more protection.

As shown in FIG. 10, side wall 120 defines a plurality of circumferentially disposed slots 184 formed completely through side wall 120 and extending through the end of side wall 120 that is coupled to hub shell 23 to form a plurality of coupling tabs 188. Since side wall 120 is made from a metal material that is more rigid than the resilient rubber seal member 108, side wall 120 can strongly grip hub shell 23 when hub shell 23 rotates relative to driving member, but slots 184 allow the coupling tabs 188 to bend radially outwardly for easy removal of housing 104 from hub shell 23.

Figure 11:
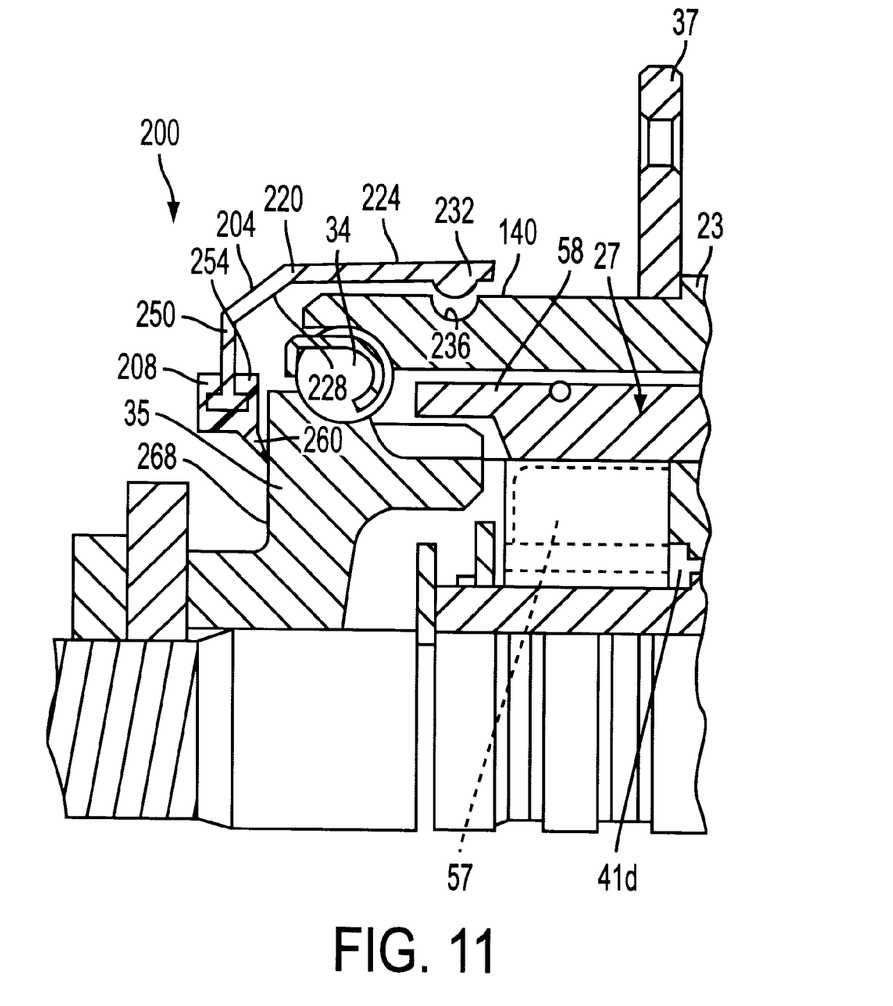
FIG. 11 is a more detailed view of the bearing cone seal shown in FIG. 2.

FIG. 11 is a more detailed view of the bearing cone seal 200 shown in FIG. 2. As shown in FIG. 11, annular housing 204 includes a cylindrical metal side wall 220 having an outer peripheral surface 224 and an inner peripheral surface 228. Side wall 220 has a coupling wall or projection 232 engaging a hub coupling groove 236 formed on the outer peripheral surface 140 of hub shell 23. A seal coupling wall or projection 250 extends radially inwardly from side wall 224 for engaging a complementary seal coupling groove 254 formed in the upper portion of seal member 208.

In this embodiment, seal member 208 is a rubber member retained to the inner peripheral surface of housing 204. An inner peripheral surface of seal member 208 forms a lip 260 extending radially inwardly and contacting an outer peripheral surface 268 of bearing cone 35. Although not shown in the drawings, side wall 220 defines a plurality of circumferentially disposed slots formed completely through side wall 220 and extending through the end of side wall 220 that is coupled to hub shell 23 to form a plurality of coupling tabs in the same manner shown in FIG. 10 for housing 104. In the same way, side wall 220 can strongly grip hub shell 23 when hub shell 23 rotates relative to bearing cone 35, but the slots formed in side wall 220 allow the coupling tabs to bend radially outwardly for easy removal of housing 204 from hub shell 23.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Although the driving member seal 100 and cone seal 200 were shown as being coupled to the outer peripheral surface of hub shell 23, the seals could be coupled to the inner peripheral surface of hub shell 23. Although a coupling projection on the housings 104 and 204 were shown engaging complementary coupling grooves 136 and 236 on hub shell 23, coupling projections could be formed on hub shell 23 for engaging complementary coupling grooves on the seal housings. Although a seal groove 164 was shown on driving member 22 for engaging first lip 160, such a groove is not necessary. The sealing apparatus according to the present invention could be applied to any type of internal hub transmission having any number of speeds.

Thus, the scope of the invention should not be limited by the specific structures disclosed. Instead, the true scope of the invention should be determined by the following claims.

What is claimed is:

1. A seal for a bicycle transmission comprising:

an annular housing including a side wall having an outer peripheral surface and an inner peripheral surface, wherein the side wall defines a plurality of circumferentially disposed slots defining a plurality of coupling tabs;

an annular seal member formed from a resilient material, wherein the seal member is retained to the housing and extends radially inwardly;

wherein the housing includes a coupling projection extending radially inwardly from at least one of the plurality of coupling tabs for engaging an outer surface of the bicycle transmission;

wherein the coupling projection is axially spaced apart from the seal member; and wherein the housing is formed from a material that is more rigid than the seal member.

2. The seal according to claim 1 wherein the plurality of slots extend through an end of the side wall.

3. The seal according to claim 1 wherein the housing is formed from metal.

4. The seal according to claim 3 wherein the seal member is formed from rubber.

5. The seal according to claim 1 wherein the coupling projection extends from the inner peripheral surface of the housing.

6. The seal according to claim 5 wherein an outer peripheral surface of the seal member includes a coupling groove that engages the coupling projection.

7. The seal according to claim 1 wherein the side wall has a cylindrical shape.

8. The seal according to claim 1 wherein an inner peripheral surface of the seal member forms a first lip.

9. The seal according to claim 8 wherein the seal member includes a second lip extending in a different direction from the first lip.

10. The seal according to claim 1 wherein the seal member is retained to the inner peripheral surface of the housing.

11. A bicycle hub comprising:

a hub shell that rotates around a hub axis, wherein the hub shell has at least one of a hub coupling projection or a hub coupling groove on an outer peripheral surface thereof;

an inner member disposed coaxially with the hub shell;

a transmission for communicating a driving force to the hub shell through a plurality of transmission paths; and a seal including:

an annular housing including a side wall having an outer peripheral surface and an inner peripheral surface, wherein the side wall has at least one of a side wall coupling projection or a side wall coupling groove engaging the at least one of the hub coupling groove or hub coupling projection, respectively, so that the housing is nonrotatably retained to the hub shell when the hub shell rotates around the hub axis;

the side wall defines a plurality of circumferentially disposed slots;

an annular seal member retained to the housing, extending radially inwardly and contacting the inner member; and wherein the seal member is axially spaced from the at least one of the side wall coupling projection or the side wall coupling groove.

12. The bicycle hub according to claim 11 wherein the inner member comprises a driving member rotatably mounted around the hub shell for supplying the driving force to the hub shell.

13. The bicycle hub according to claim 11 wherein the inner member comprises a bearing cone.

14. The bicycle hub according to claim 12 wherein the plurality of slots extend through an end of the side wall that is coupled to the hub shell.

15. The bicycle hub according to claim 11 wherein the seal member is formed from a resilient material.

16. The bicycle hub according to claim 11 wherein the at least one of the hub coupling projection or hub coupling groove is the hub coupling groove, wherein the at least one of the side wall coupling projection or side wall coupling groove is the side wall coupling projection, and wherein the side wall coupling projection engages the hub coupling groove.

17. The bicycle hub according to claim 16 wherein the side wall coupling projection is disposed on the inner peripheral surface of the side wall.

18. The bicycle hub according to claim 11 wherein a seal coupling projection extends radially inwardly from the side wall, and wherein the seal member includes a seal coupling groove engaging the seal coupling projection.

19. The bicycle hub according to claim 11 wherein the side wall has a cylindrical shape.

20. The bicycle hub according to claim 11 wherein an inner peripheral surface of the seal member forms a first lip.

21. The bicycle hub according to claim 20 wherein the seal member includes a second lip extending in a different direction from the first lip.

22. A bicycle hub comprising:
 a hub shell that rotates around a hub axis, wherein the hub shell has at least one of a hub coupling projection or a hub coupling groove on an outer peripheral surface thereof;
 an inner member disposed coaxially with the hub shell;
 a transmission for communicating a driving force to the hub shell through a plurality of transmission paths; and
 a seal including:
  an annular housing including a side wall having an outer peripheral surface and an inner peripheral surface, wherein the side wall has at least one of a side wall coupling projection or a side wall coupling groove engaging the at least one of the hub coupling groove or hub coupling projection, respectively, so that the housing is nonrotatably retained relative to the hub shell;
  an annular seal member retained to the housing, extending radially inwardly and contacting the inner member; and
   wherein the seal member is axially spaced from the at least one of the side wall coupling projection or the side wall coupling groove;
 wherein the at least one of the hub coupling projection or hub coupling groove is the hub coupling groove, wherein the at least one of the side wall coupling projection or side wall coupling groove is the side wall coupling projection, wherein the side wall coupling projection is disposed on an inner peripheral surface of the side wall and engages the hub coupling groove, and wherein the side wall defines a plurality of circumferentially disposed slots extending through an end of the side wall that is coupled to the hub shell.

23. The bicycle hub according to claim 22 wherein the housing is formed from metal, and wherein the seal member is formed from rubber.

* * * * *